No. 719,850. PATENTED FEB. 3, 1903.
O. OHLSSON.
JOURNALING AND SUSTAINING DEVICE FOR ROTATING PARTS.
APPLICATION FILED SEPT. 21, 1901.
NO MODEL.
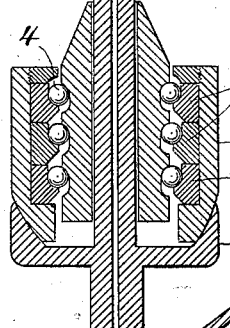
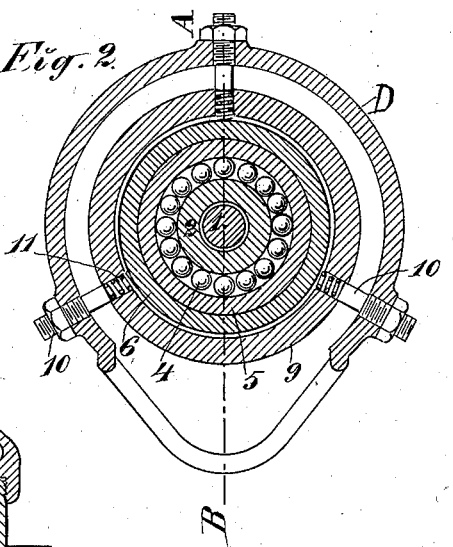
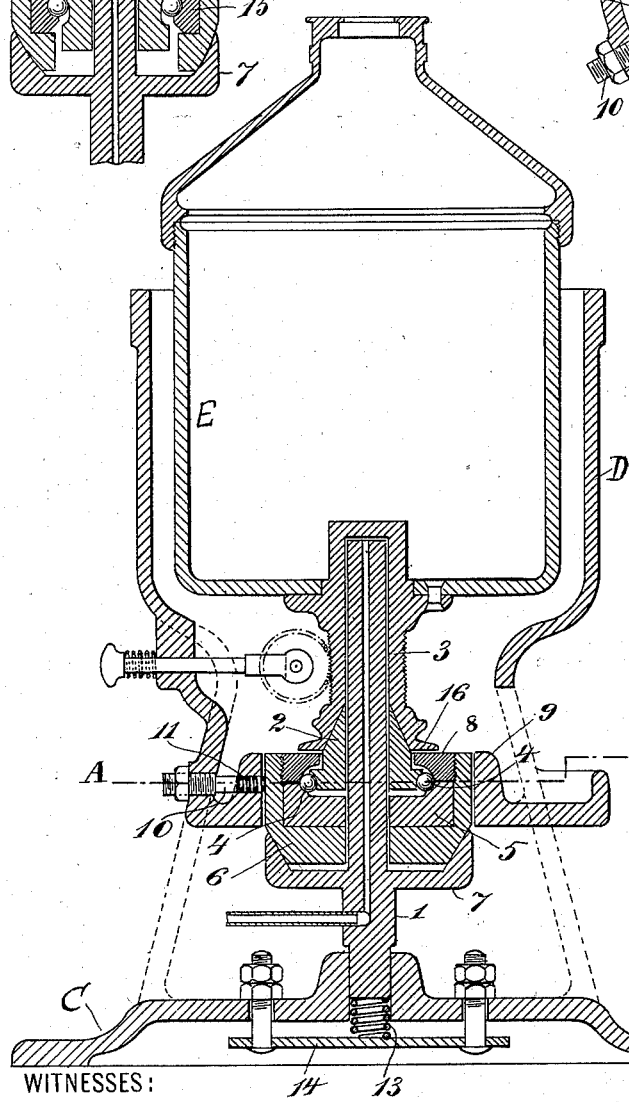
WITNESSES:
INVENTOR
Olof Ohlsson
BY
ATTORNEY

UNITED STATES PATENT OFFICE.

OLOF OHLSSON, OF SÖDERTELJE, SWEDEN.

JOURNALING AND SUSTAINING DEVICE FOR ROTATING PARTS.

SPECIFICATION forming part of Letters Patent No. 719,850, dated February 3, 1903.

Application filed September 21, 1901. Serial No. 76,036. (No model.)

*To all whom it may concern:*

Be it known that I, OLOF OHLSSON, a citizen of the United States, residing at Södertelje, in the Kingdom of Sweden, have invented certain Improvements in Journaling and Sustaining Devices for Rotating Parts, of which the following is a specification.

This invention relates to supporting-bearings for the shafts or journals of drums of centrifugal machines and the like, the object being in the main to reduce friction and to cause the shaft of the rotating part to tend always to center itself in its bearings.

The invention will be hereinafter fully described with reference to the accompanying drawings, and its novel features carefully defined in the claims.

In the said drawings, Figure 1 is a vertical axial section of a centrifugal apparatus embodying the invention, and Fig. 2 is a horizontal section of the same at line A B in Fig. 1. Fig. 3 is a sectional view illustrating a construction where the bearing has several series of balls arranged one above another.

C designates a base-plate or bed-piece; D, an outer frame and casing on the bed-piece, and E a centrifugal drum. These may be of the usual form.

1 is a non-rotative upright supporting-stem set in a socket in the bed-piece. The tubular shaft of the drum E slips down over the said stem 1. This tubular shaft is composed of two parts or sections—namely, the lower section 2, which is coned at its upper end and is relatively broad at its base or lower extremity, and an upper section 3, fixed to the drum at its upper end and bored out conically at its lower end to fit snugly the conical upper end of the section 2 below. Owing to the friction between the parts where the sections 2 and 3 fit together they both rotate together; but the construction permits the drum, together with the section 3, to be lifted off from the stem 1 without disturbing the parts below.

As stated above, the lower end of the section 2 is relatively broad, forming a circular flanged foot, about the margin of which is formed a ball-track, which bears upon a series of balls 4, resting in a ball-track formed in a block or supporting-plate 5. This supporting plate or block 5 rests and fits in a socket or cavity in a cup 6, the bottom of which at the bearing-points is spherical. The cup 6 sets in a cup 7 on and integral with the stem 1. In the cup 6 is screwed a ring 8, which takes over the laterally-enlarged lower end of the section 2 of the shaft of the drum.

About the cup 6 is a loosely-embracing ring-flange 9 on the casing-frame D, and set in radial bores in said ring-flange are screws 10, which bear upon springs 11, that press at their inner ends on the cup 6. These screws are for the adjustment of the cup 6 in its supporting-cup 7, the adjustment being permitted by the spherical bearing of one cup within the other. It may be stated that the center of this sphere is at the point in Fig. 1 where the line A B intersects the axis of the stem 1.

The lower end of the stem 1 rests on a spring 13, which is supported below on a plate 14, adapted to be raised and lowered by bolts 12 in the bed-piece, as clearly illustrated in Fig. 1. This spring device serves as an elastic cushion for the entire mechanism and the bolts as a means for raising and lowering the same.

The broad bearing or support provided by the flanged foot of the section 2 of the drum-shaft obviates the necessity of a second bearing above, and the fact that a radial line drawn through the center of each ball and through the points where the ball bears at opposite sides on ball-tracks inclines downwardly and outwardly causes the shaft of the drum to center itself in the ring of balls. The bearing of the track on the section 2 of the shaft of the drum is on that part only of the ball which is above the center thereof at the inside, while the track on the block 5 bears on the lower part of the ball at the outside.

There may be more than one set of balls, as shown in Fig. 3, where the cup 6' is represented as deeper than in Fig. 1, and three superposed rings 15, corresponding in function to the block 5, are employed. The lower section or part of the stem of the drum will in this case have three flanges with ball-tracks, one for each of the three sets of balls.

16 designates the pulley or sheave on the section 2 for driving the drum with a belt.

Having thus described my invention, I claim—

1. In a device for the purpose specified, the combination with the frame, the drum-shaft provided with an outer ball-track and an oscillating cup with a spherical bottom and carrying an interior ball-track, of the balls embraced between these tracks, the cup which takes under and supports the oscillating cup, and the laterally-disposed spring-supports in the frame and bearing on the sides of the oscillating cup, substantially as set forth.

2. In a device for the purpose specified, the combination with the frame, the drum-shaft having a laterally-enlarged base provided with an outer ball-track, an oscillating cup embracing said base and carrying an inner ball-track, balls between said tracks, means for supporting said oscillating cup, and yielding spring-supports about said oscillating cup, substantially as set forth.

3. In a device for the purpose specified, the combination with the stem and the cup 7 thereon, of the oscillating cup 6 mounted in the cup 7, the block 5, mounted in the cup 6 and provided with a ball-track, the tubular shaft embracing the stem and having a ball-track at its base, the balls between said tracks, and spring devices for steadying the said oscillating cup, substantially as set forth.

4. In a device for the purpose specified, the combination with the upright non-rotative stem provided with a cup 7, having a spherical bearing, the casing-frame, the cup 6 mounted in the cup 7, and the adjusting-screws and springs for said cup 6, of the block 5 in the last-named cup, the part to be rotated, its shaft, and the balls between an outer track on the block 5 and an inner track on the foot of said shaft.

5. In a device for the purpose specified, the combination with the part to be rotated, and the stem 1, of the tubular shaft of said rotating part, comprising the sections 2 and 3, the former having a broad foot and a coned upper end, and the latter being secured above to the rotating part and having a hollow cone at its lower end to fit frictionally on the section 2, a support borne by the stem 1, and a series of balls between tracks respectively on the said support and the broad foot of the shaft of the rotating part.

In witness whereof I have hereunto signed my name in the presence of two subscribing witnesses.

OLOF OHLSSON.

Witnesses:
ERNST SVANQVIST,
A. F. LUNDBORG.